United States Patent [19]

Lehmann

[11] Patent Number: 4,768,372
[45] Date of Patent: Sep. 6, 1988

[54] TEST DEVICE, IN PARTICULAR FOR BOTTLE-SHAPED CONTAINERS AS WELL AS PROCEDURE FOR TESTING SAME

[76] Inventor: Martin Lehmann, Obere Farnbühlstrasse 1, 5610 Wohlen 1, Switzerland

[21] Appl. No.: 54,271

[22] PCT Filed: Aug. 26, 1986

[86] PCT No.: PCT/CH86/00121
§ 371 Date: May 4, 1987
§ 102(e) Date: May 4, 1987

[87] PCT Pub. No.: WO87/01449
PCT Pub. Date: Mar. 12, 1987

[30] Foreign Application Priority Data

Apr. 9, 1985 [CH] Switzerland ............ 3805/85

[51] Int. Cl.⁴ ............................ G01M 3/02
[52] U.S. Cl. ....................... 73/49.2; 73/825
[58] Field of Search ........... 73/41, 49.2, 794, 825, 73/818, 819, 821

[56] References Cited

U.S. PATENT DOCUMENTS

| | | | |
|---|---|---|---|
| 3,771,649 | 11/1973 | Strauss | 73/819 X |
| 3,777,556 | 12/1973 | Zappia | 73/825 |
| 3,805,594 | 4/1974 | Hayashi | 73/49.2 |

*Primary Examiner*—Jerry W. Myracle
*Attorney, Agent, or Firm*—Antonelli, Terry & Wands

[57] ABSTRACT

The test device (7) serves in particular for testing bottle-shaped containers (4), and is in the form of a piston/cylinder assembly. It has two pistons (41, 53) in order to test simultaneously or consecutively two properties of the container (4), while the position of the container (4) and cylinders (30, 31) remains the same. The two pistons (41, 53) can be operationally connected by a piston rod (42). The piston strokes are different. Containers which are to be filled with a liquid material and are preferably made of plastic can be tested in this way before they are filled with the material thus making it possible to locate quickly and unambiguously any containers which are to be rejected owing to their dimensions, resistance to crushing, sealing property and so on, before the filling process takes place.

7 Claims, 2 Drawing Sheets

TEST DEVICE, IN PARTICULAR FOR BOTTLE-SHAPED CONTAINERS AS WELL AS PROCEDURE FOR TESTING SAME

BACKGROUND OF THE INVENTION

The present invention relates to a test device, in particular for bottle-shaped containers, fashioned as a piston/cylinder assembly, as well as to a procedure for testing especially bottle-shaped containers consisting essentially of a synthetic resin.

During the course of continuously increasing efficiency, efforts are made to run certain events within ever shorter time periods in order to reduce overall costs and time in, for example, the packaging industry.

It has been found in this connection that, in the packaging industry, the performance of individual working steps entails not only spatial but also chronological overloads in that the transit time in, for example, the canning industry, from checking the empty container to checking after labeling, requires a long treatment path and a long treatment time.

The present invention has the object, along these lines, to simplify the existing conditions in such a way that, in particular, containers to be filled with liquid material which preferably consists in the majority of a synthetic resin can be tested before being filled with the material in order to quickly and unambiguously locate any rejects, for example, with respect to dimensioning, crushing resistance, leakproofness, and the like, prior to the filling procedure.

As is known, one strength of such containers particularly synthetic resin bottles, is determined with the aid of a compression device. Such testing machines, operating with spindle drives or simple pistons, are conventional. Thereafter, the leakproofness of the container is then tested, for example, in a further machine.

In this process, there is not only a need for two different devices or machines, but also for a corresponding time period for moving the test specimens and for conducting the corresponding test.

The present invention has the object of providing an improvement in this respect so that such tests are made simpler in every respect, i.e. with regard to space occupied, time requirement, need for machines.

The present testing device comprises several pistons in order to test several properties of the container with the container and cylinder remaining in the same position.

A corresponding procedure is distinguished in that the container and the test device are placed into the testing position and subsequently, leaving the two items in the testing position, several properties of the container are tested.

The invention will be described in detail below by way of example with reference to the accompanying drawings.

DETAILED DESCRIPTION

Figure 1:
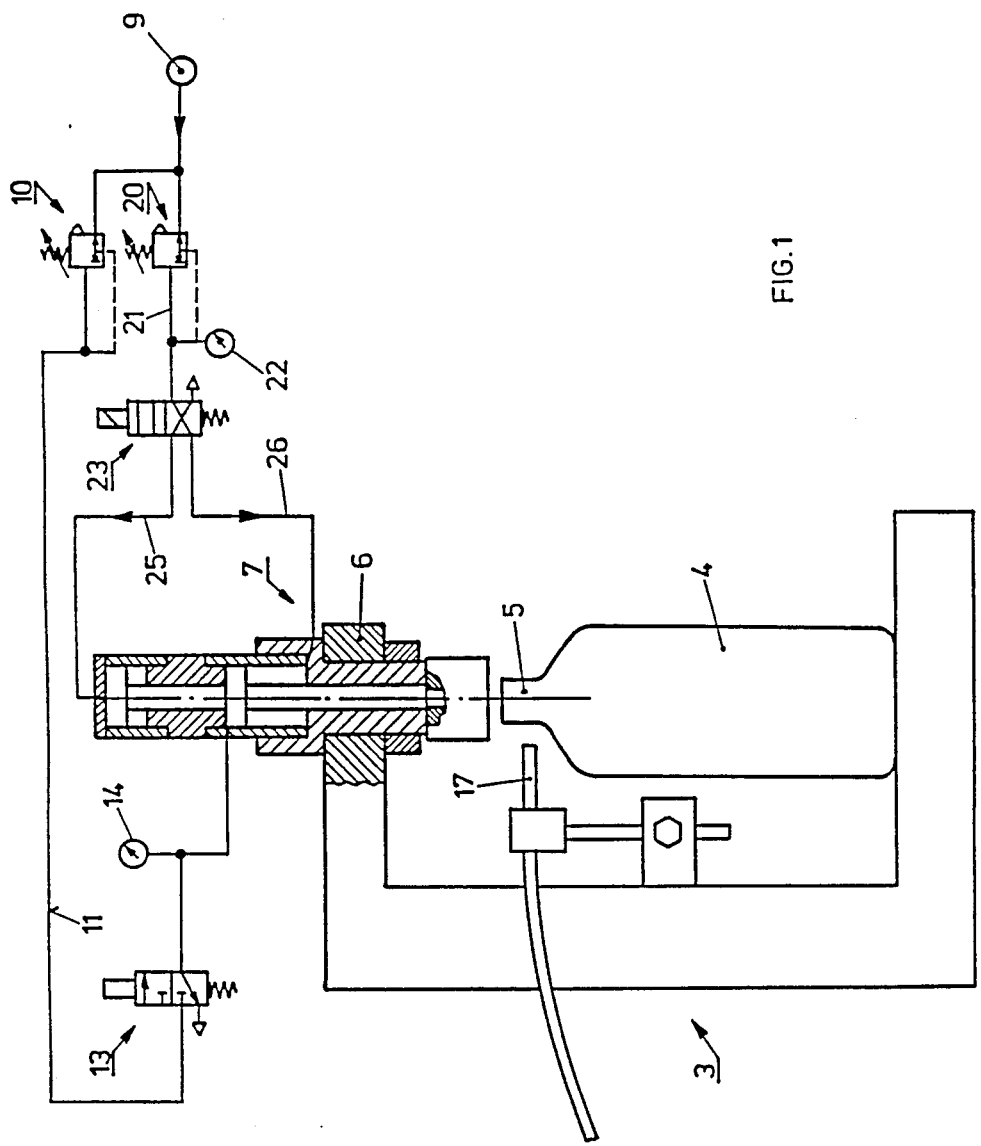
FIG. 1 is a partial cross-sectional schematic view of a testing installation for testing a crushing resistance and leakproofness of bottles manufactured from a synthetic resin.

Referring now to the drawings when like reference numerals are used throughout the various views to designate like parts and, more particularly, to FIG. 1, according to this figure, a testing installation for testing bottle-shaped containers consisting of a synthetic resin according to the present invention includes a test specimen in the form of a bottle 4 disposed in a test yoke 3 arranged along a revolving or linearly moving feed line. The test specimen involves a simple bottle 4 with a bottleneck 5. A test device 7 is attached in the upper yoke arm 6 of the test yoke 3, with the test device 7 including a piston/cylinder assembly and being operated by compressed air. A compressed-air connection 9 is provided with a pressure regulator 10 for regulating the air pressure required for determining the crushing resistance of the bottle 4. The compressed air, controlled in this manner, passes via a supply conduit 11 to a 3/2-way valve 13 which can be switched so that the adjoining conduit, containing a manometer 14, is either supplied with compressed air or, alternatively, in the position illustrated in FIG. 1, exhausts air into the atmosphere from the test device 7.

The testing installation furthermore includes a limit switch 17 which becomes operative in case the bottle 4, the neck 5 of which is exposed to axial pressure, does not exhibit the demanded crushing resistance and therefore the corresponding part of the test device 7 drops downwards and thus actuates limit switch 17. The limit switch 17, activated in this manner, ensure that, during the further course of movement, the corresponding bottle 4 is carried away as a reject.

In a conduit parallel to the supply conduit 11, a pressure regulator 20 is disposed for regulating the adjustable leakproofness pressure to which the bottle 4 is exposed as will be explained below. A supply conduit 21 leads to a manometer 22 and to a 4/2-way valve 23, with one connection of the valve 23 serving to couple a supply conduit 25 to effect sealing of the bottle 4 for its leakproofness test with the use of compressed air, while the second supply conduit 26 delivers the compressed air for returning the test device into its initial position.

Figure 2:
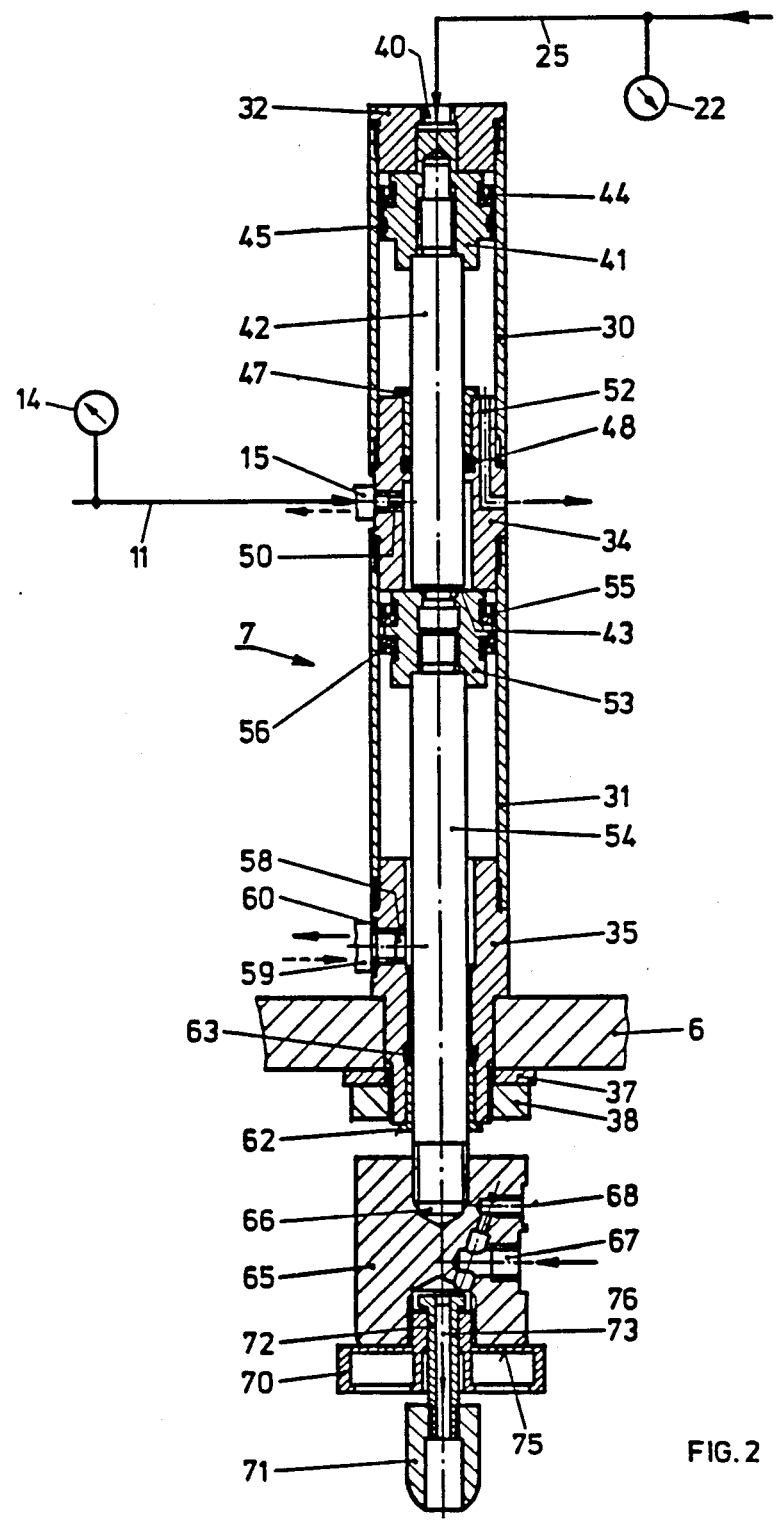
FIG. 2 is a partially schematic axial cross-sectional view, on an enlarged scale, of a test device as utilized in the testing installation of FIG. 1.

As shown in FIG. 2, the test device 7 comprises a top cylindrical jacket 30 and a bottom cylindrical jacket 31. The top cylindrical jacket 30 is closed off by a cylinder cover 32. The two cylindrical jackets 30 and 31 are threaded together by a connecting nipple 34. The bottom cylindrical jacket 31 is sealed off by a cylinder sealing nipple 35 with an end of the nipple 35 being provided with a thread so that the test device 7 can be attached with the air of a mounting ring 37 and a securing ring 38 in the upper yoke arm 6.

The cylinder cover 32 is equipped with a central compressed-air connection bore 40, which latter leads into the interior of the cylindrical jacket 30 wherein an upper piston 41 is displaceably arranged. The piston 41 is provided with an inner piston rod 42 having a free end face 43, with the piston 41 being sealed with respect to the cylindrical jacket 30 by an annular lip seal 44 and an O-ring 45. The piston rod 42 extends into an upper guide bushing 47 introduced within the connecting nipple 34 and provided with an O-ring seal 48. A compressed-air bore 50 laterally arranged in the connecting nipple 34 includes a coupling nipple 51 through which compressed air can be supplied from the supply conduit 11, with the connecting nipple 34 having a vent bore 52 terminating in the cylindrical chamber of the top cylinder jacket 30.

A lower piston 53 with a piston rod 54 is provided beneath the connecting nipple 34, with the piston 53 being equipped with two annular lip seals 55 and 56.

The cylinder-closing nipple 35 has a lateral compressed-air bore 58 with a nipple 59, sealed by an O-ring 60. The piston rod 54 is guided in a lower guide bushing 62 with an O-ring gasket 63 in the cylinder-closing nipple 35.

The bottom end of the piston rod 54 is designed as a threaded pin serving for retaining a coupling head 65, the threaded pin being threaded into the threaded bore 66 of the coupling head 65. Two bores are provided in radial extension laterally in the coupling head 65, a compressed-air bore 67 and a coupling bore for a manometer 68. The two bores communicate with each other through a longitudinal bore terminating in a lower threaded bore of the coupling head 65. The threaded bore serves for accommodating a sealing cap 70 which, in turn, retains a sleeve 72 with a longitudinal bore 73 with the aid of a threaded pin 76 so that the compressed-air bore 67 can conduct air, via the longitudinal bore 73 of the sleeve 72, into a central opening of a size-determining measuring head 71. An inner sealing surface 75 is provided, for resting on the end rim of the bottleneck 5, for example, while the leakproofness test is being performed.

If the bottle 4 is to be subjected to a leakproofness test, the valve 23 is adjusted so that the compressed air passes through the supply conduit 25 and the compressed-air coupling bore 40 to the free end face of the upper piston 41 and moves same downwardly. During this step, the free end of the piston rod 42 comes into contact, with its surface 43, with the free surface of the lower piston 53 so that the piston rod forces the lower piston together with its piston rod 54 and the parts attached thereto in the downward direction. During this procedure, the size-determining measuring head 71 enters the bottleneck 5 and tests its passage. Subsequently, the sealing cap 70, with its sealing surface 75, contacts the top rim of the bottleneck 5. During this movement, the upper piston 41 has entered its bottom abutment position. In this position, the sealing surface 75 rests, with a predetermined, settable pressure, on the free rim of the bottleneck 5 so that the interior of the bottle is sealed with respect to the outside. By corresponding control, compressed air now passes through the bores 67 and 73 into the interior of the bottle 4 and the latter is filled with air. In this procedure, the final pressure must be maintained for a predetermined time period so that the bottle can be evaluated as being leakproof. A corresponding control takes care of the elimination of leaky bottles 4. These control units, known per se, do not constitute the subject of the present invention and thus are not explained in detail.

For testing the resistance to crushing of the bottle 4, correspondingly compressed air passes via the supply conduit 11 and the nipple 15, as well as the bore 50 into the interior of the connecting nipple 34 where the air acts on the free piston surface of the lower piston 53, which opposes the surface 43, and urges the piston downwardly. During this movement, as in the leakproofness test, the sealing surface 75 of the sealing cap 70 again comes into contact with the rim of the bottleneck 5. In this connection, the force exerted on the bottle rim and acting in the direction of the longitudinal axis of bottle 4 is significantly higher than the force required for sealing purposes. In this manner, the bottle 4 is subjected to a crushing test. If the structure of the bottle 4 is perfect, it will withstand this crushing pressure. If the bottle 4 is flawed due to, for example, a thin wall thickness, or an irregularly distributed wall thickness, and the like, then the bottle 4 will not withstand the force exerted on the bottle 4, and it will buckle. Due to the correspondingly large stroke of the lower piston 53, the sealing cap 70, while the bottle 4 buckles, will come into contact with the limit switch 17 and activate, as explained, the reject control.

For returning the two pistons 41 and 53, the supply conduit 26 is supplied with compressed air (switching arrangement in accordance with FIG. 1). The compressed air returns the piston 53 and, pushing it in front thereof, the piston rod 42 with the piston 41 into the upper abutment positions according to FIG. 2. During this step, the corresponding cylinder chamber is vented by the bore 50 by setting the valve 13, by switchover, to "exhaust" as can be seen in FIG. 1. Correspondingly, air is exhausted into the atmosphere through the conduit 25 by the valve 23, as illustrated. In order to prevent formation of a vacuum in the upper cylinder chamber, air from the atmosphere flows into the interior of the cylinder via the venting bore 52.

Leakproofness test and crushing test can be performed as desired in a freely selectable fashion in succession or simultaneously. In order to ensure independence of the two tests, the stroke of the upper piston 41 is, therefore, smaller, for example by 20 mm, than that of the lower piston 53. In this context, it should be noted, in principle, that the measure of the crushing force, to be employed as the limit force, must be larger in case of an internal excess pressure in the bottle 4, i.e. when performing the leakproofness test at the same time, than in case of normal pressure being ambient in the bottle 4. However, this circumstance can be taken care of by an appropriate setting of the pressures for operating the pistons.

If the two tests are to be conducted in succession, for example first the crushing step and then the leakproofness testing step, then the crushing piston must be relieved after performing the crushing step, which is accomplished by the switching of the valve 13 as shown in FIG. 1.

If the bottle 4 can withstand the crushing force during the crushing test, then the piston 53 is relieved after the crushing pressure testing period has elapsed; optionally, only the contact force according to the load of the upper piston 41 acts on the bottle 4 for sealing the same and for performing the leakproofness test.

It is accordingly possible to carry out additional functional tests, especially also other tests, such as holding of the bottle for imprinting same, a height control of the bottle, and the like. The sequence of the tests and/or functions to be effected can be freely chosen, it being basically possible to perform other, additional functions on the bottle 4 by the arrangement of further pistons.

This combined installation with the test device along the lines of the structure of the test device 7 is very suitable, in particular, for high-performance machines, for example for testing carrousels, since in this case it is possible to provide that, per testing station, with a time stagger, the tests can follow one another in series and/or they can be performed simultaneously without an additional movement of the cylinder of the test device and of the container to be tested.

In a carrousel testing machine, also called testing wheel, with four and more testing stations, mechanical engineering is substantially simplified by this device. It is, of course, likewise possible to perform only individual ones of the provided testing possibilities; this is a choice that can be made at the corresponding switchboard and selection board.

I claim:

1. A method for testing properties of bottle-shaped containers, the method comprising subjecting the container to a crushing step by a pneumatically moved, piston-like, springless member essentially while maintaining an ambient pressure in an interior of the container, adjusting the gas pressure and the desired crushing force acting on the container, and subjecting the container at least to a leakproofing test while maintaining the container in place.

2. A method for testing properties of bottle-shaped containers, the method comprising subjecting the container to a crushing step by a pneumatically moved, piston-like, springless member essentially while maintaining an ambient pressure in an interior of the container, adjusting the gas pressure and the desired crushing force acting on the container and for testing leakproofness, the method further comprises sealingly attaching a piston-like first member to an orifice of the container, determining a path and lift-off pressure of the piston-like first member from the container by a second, piston-like, pneumatically operated member, and subsequently placing the container under an internal pressure, maintaining the internal pressure constant, and evaluating the internal pressure as a positive sealing criterion of the container.

3. A method according to claim 2, characterized in that the crushing as well as the leakproofness tests are performed while leaving the container in place.

4. Testing installation, especially for bottle-shaped containers, the testing installation including at least one piston/cylinder assembly comprising two separate individually pneumatically operable pistons operatively connected in a springless fashion and adjusting means for varying the gas pressure and thus at least one of a crushing force and leakproofness testing pressure while leaving the container in place.

5. Installation according to claim 4, wherein said piston/cylinder assembly includes two coaxial pistons arranged in a common cylinder and having separate cylinder chambers.

6. Installation according to one of claims 4 or 5, wherein at least one piston rod means is provided for operatively connecting the two pistons.

7. Installation according to claim 6, wherein stroke lengths of the pistons are unequal, and wherein a stroke length of the piston in closer proximity to the container has a longer stroke length.

* * * * *